United States Patent

[11] 3,625,574

[72] Inventor Dominic Plastino
 Montreal, Quebec, Canada
[21] Appl. No. 857,667
[22] Filed Sept. 15, 1969
[45] Patented Dec. 7, 1971
[73] Assignee Pac-Trac Industries Limited
 Ottawa, Ontario, Canada
[32] Priority July 14, 1969
[33] Canada
[31] 056,997

[54] TRACK ELEMENT FOR SELF-LAYING TRACK-TYPE VEHICLE
9 Claims, 2 Drawing Figs.

[52] U.S. Cl. .................................................. 305/40,
 305/57
[51] Int. Cl. .................................................. B62d 55/18
[50] Field of Search .................................. 305/40, 37,
 39, 56, 57

[56] References Cited
UNITED STATES PATENTS

| 1,314,077 | 8/1919 | Green | 305/40 |
| 1,420,531 | 6/1922 | Dutkiewicz | 305/40 |
| 2,385,453 | 9/1945 | Leguillon | 305/37 |
| 3,346,306 | 10/1967 | Siber | 305/37 X |

FOREIGN PATENTS

| 859,332 | 6/1940 | France | 305/40 |

Primary Examiner—Richard J. Johnson
Attorney—Fetherstonhaugh and Co.

ABSTRACT: A track for a track laying vehicle in which the individual track elements are joined together by a series of separate wire rope connectors which fit into recesses in the track element and are held in place by a bolted cover plate. Each track element has a pair of cams at each of four corners. One of the cams of each pair being curved upwardly and the other being curved downwardly such that rotational movement of one track element relative to the adjacent track element results in at least one cam one of one track element rolling on the surface of a cam on the adjacent track element.

PATENTED DEC 7 1971                                3,625,574

INVENTOR
D. PLASTINO

Fetherstonhaugh & Co.
PATENT AGENTS

TRACK ELEMENT FOR SELF-LAYING TRACK-TYPE VEHICLE

The present invention relates to tracks and in particular to a track element for use with a track laying vehicle.

A very large number of track laying vehicles are in use at the present time and there exists a large variety of tracks and track elements. The most common track element which is used in heavy earth moving equipment and also in military vehicles comprises a metal grouser, which contacts the ground, and some means of joining the individual track elements together, the most common means being a hinge pin. This type of arrangement of course results in a tremendous amount of wear particularly when these vehicles are used on rough terrain. For military vehicles the noise that results in such vehicles is objectionable. The number of spare parts that must be carried is high since complete track elements in addition to the pins joining the track elements and all necessary bolts must accompany the vehicles as well as a very involved mechanism for tensioning the track so that a complete track element can be removed. In some designs the bolts which hold the various parts together protrude through the grouser and actually contact the ground. These bolts of course are subjected to wear and as a result after having been used for a short period of time these bolts must be cut off with a torch in order to remove the tread or track from the vehicle.

One attempt to provide a solution to these problems is shown in Canadian Pat. No. 802,779 which issued on Dec. 31, 1968. This track element comprises a grouser which contacts the ground and a guideplate or coverplate which is bolted to the top of the grouser. The track elements are joined together by a separate component piece which consists of two limb elements which are joined by a strip of rubber in which there is embedded a series of cables. These cables stretch from one limb element to the next and are secured to the limb elements by swagging. Since these limb elements are secured one in one grouser and the other to the grouser of the next track element, there is flexing when one track element moves relative to the other. This motion of one track element with relation to the other is taken up by a series of curved cams on the limb elements. Thus movement of one track element with the other results in a rolling motion of one cam over the surface of the other. In addition since the cams are offset one from the other they prohibit lateral movement of one track element to the next.

This scheme of joining track elements has proven to have several serious disadvantages. The number of components is small but when a break occurs, say in one cable which is embedded in the rubber, additional failures follow and as a result the whole component comprising the limb element and the cables must be removed completely and replaced. The limb elements, since they grasp and secure the cables by swagging must be of a malleable material and are quite soft. However the cams that ride one upon the other must be made of this same material and the resultant wear on the cams is high.

It is therefore an object of the present invention to provide a track element which has reduced wear, is simple to repair in the field and the number of spare parts which must be kept on hand is at a minimum.

Accordingly the present invention provides a track element for a track laying vehicle comprising a series of identical track elements consecutively joined together, each of said elements comprising a grouser and a cover plate removably secured thereto, the adjacent elements forming the track being joined together by a plurality of connectors, said connectors each comprising a length of wire rope having a ferrule at each end, the ferrule at one end of the connector being adapted to fit within a recess in the grouser of one track element and the ferrule at the other end of the connector being adapted to fit within a recess in the grouser of the adjacent track element, said ferrules being retained in the recess in the grouser by said cover plate, said grouser having at each corner an upwardly curving cam and a downwardly curving cam, the cams of adjacent track elements meshing with each other such that rotational movement of one track element relative to the adjacent track element results in one cam of said first track element rolling on the surface of a cam of the adjacent track element.

The following is a description by way of example of a certain embodiment of the present invention, reference being had to the accompanying drawing in which.

Figure 1:
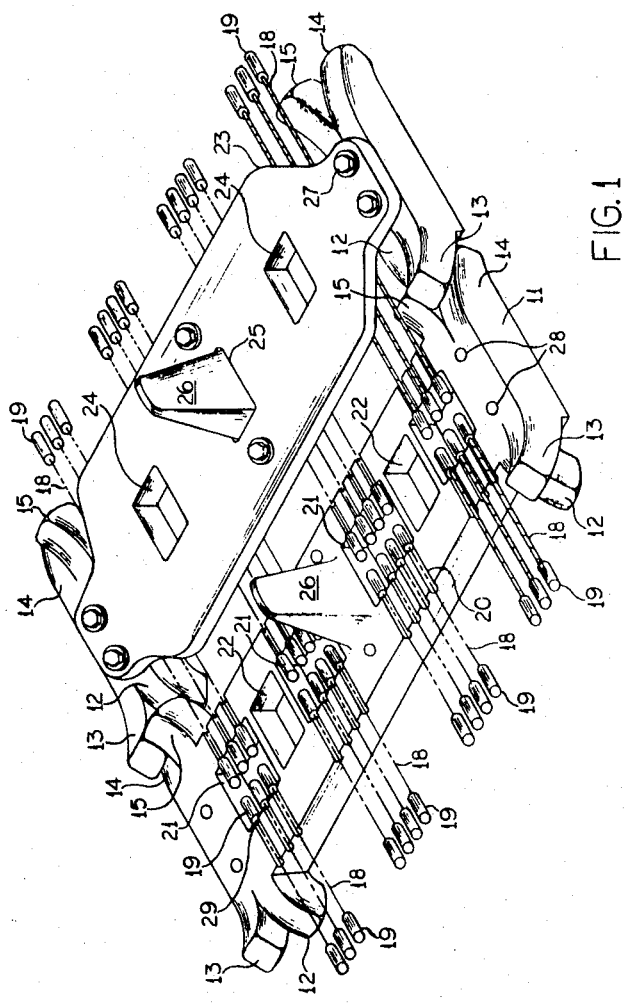
FIG. 1 is an isometric view of two adjoining track elements of the present invention.

Referring to FIG. 1 the track element is comprised of a grouser 11 which is the main element of the track and it is that part of the track element which contacts the ground. Looking at one end of the grouser it will be seen that there is an outer upwardly curved cam 13 and an adjoining inner downwardly curving cam 12. At the other side of the same end of the grouser there is an outer downwardly curving cam 14 and an adjoining upwardly curving cam 15. The other end of the grouser has these same cams.

The adjoining track element of course is identical to the first and it will be seen that the outer upwardly curved cam 13 of one track element meshes with an outer downwardly curved cam 14 of the second track element. In a similar manner the inner downwardly curved cam 12 of the first track element meshes with the adjoining inner upwardly curved cam 15 of the next track element. The same meshing takes place at the other end of the two track elements, thus any rotational movement of one track element relative to the other results in a rolling motion of one cam over the surface of another with very little sliding taking place. In addition, since the cams interlock one with the other, upwardly curved cams 13 being outboard of upwardly curved cams 15 lateral movement of one track element relative to the other is prevented. In the same manner downwardly curved cams 14 are outboard of downwardly curved cams 12 of the adjoining track element at both ends of the track and again lateral displacement of one track element relative to the other is prevented. Since these cams are an integral part of the grouser they are made from the same very hard metal as the grouser and any wear resulting from one cam sliding or bearing on another is kept to a minimum. The grouser is preferably formed from steel containing over 40 percent manganese.

Figure 2:
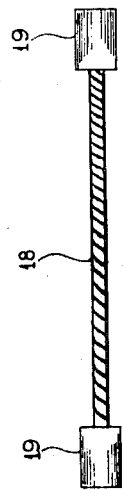
FIG. 2 is a detailed drawing of the cable and ferrules used to join the track elements together.

The method by which the adjoining track elements are secured together is quite ingenious. The grouser 11 has in its surface a series of recesses 21 and a number of grooves extending from the recesses to the edge of the grouser. A number of steel cables are used to link the track elements together. These cables are detailed in FIG. 2 and comprise a short length of cable 18 with a cylindrical ferrule 19 swaged onto the cable at each end. The ferrules 19 are adapted to fit into the recesses 21 in the grouser 11 and the cables 18 are adapted to fit into the grooves 20. The other end of the cable is inserted into a corresponding groove in the adjoining track element and the ferrule 19 fits into the recess 21 in this same adjoining track element. There do not appear to be serious limitations on the number of cables which can be used. It would seem that two is probably the minimum, and 10 is considered adequate for most applications. Fourteen cables as shown on the drawings have been used to advantage but more could be used if additional strength were required. In a preferred embodiment, the steel cables are formed from a plow wire rope having a nylon core.

The ferrules are retained in the recess 21 by means of a coverplate 23 which is bolted to the top of the grouser by a series of bolts 27 which fit into threaded holes 28 in the grouser. The coverplate is provided with sprocket wells 24 which correspond to similar sprocket wells 22 in the grouser. These sprockets wells permit the driving sprockets on the vehicle to drive the track. The sprockets protrude completely through the track element and through the grouser so that any foreign matter which may be picked up will be forced through and not retained in the track element.

The coverplate is also provided with a guide hole 25 through which the guide in the grouser protrudes. This guide, of course, is used to align the track element with the vehicle and prevent it from sliding off to one side of the drive wheels and the support wheels of the vehicle.

It is felt in some cases that stretching may take place in the cables 18 after a short period of use and if it is desired to tighten up the cables and thus bring the track elements closer together the present invention envisages the use of nylon inserts 29 which can be inserted between the ferrule and the grouser body thus bringing the adjacent track elements closer to each other.

On big advantage of the track element of the present invention is the very small number of parts required in its assembly. The track comprises a grouser, a coverplate, six bolts and a number of joining cables with swaged ferrules. The spare part problem is tremendously reduced. It is expected that very few broken grousers will result from normal wear. The coverplates are protected and are subjected to very little wear. Certainly the bolts joining the coverplate to the grouser should not be broken under normal circumstances. Some wear will result in the cables and ferrules joining adjacent track elements, however, these are very small, being only about 4 inch long and about ¼ inch diameter and a large number of these can easily be carried with no storage problem.

The replacement of broken parts is also greatly simplified with the present design. The most common breakage of course occurs with the cables and ferrules joining the adjacent track elements. These can be replaced simply by removing the six bolts 27 lifting off the coverplate 23 and lifting out the broken cables. Since the adjoining track elements usually would still be joined together by unbroken cables the replacement of the broken ones is a very simple matter.

It is further envisaged that the track element of the present invention can be usefully employed as a conveyor belt for bulk handling of heavy coarse materials. In such use many of the same problems are encountered as with a track for track laying vehicles. The conveyor belt assembly has much the same configuration as the track element illustrated in FIG. 1 with the material being conveyed resting on the side of the grouser which would normally contact the ground.

The individual thickness and strength of the connectors and the number of connectors can be varied to suit specific requirements. This of course can be done whether the track element is used on a track laying vehicle or as an element of a conveyor belt.

What I claim is:

1. A track for a track laying vehicle, comprising a plurality of identical track elements serially connected together, each of said track elements including a generally rectangularly shaped grouser provided with recesses substantially across the width thereof and a cover plate removably secured to said grouser and covering the upper surface of said grousers and a plurality of sets of individual and identical connectors connecting together every two adjacent elements of the track, each of said connectors comprising a wire rope and a pair of ferrules secured to the ends of said rope, the ferrules of the several connectors in the set being independently held in the recesses of adjacent grousers by the respective cover plates so that when the cover plates are removed, any one of the connectors in the set may be individually removed without disturbing the others.

2. The device as defined in claim 1 together with upwardly curved cams and downwardly curved cams provided at the corners of the grouser of each track element, said cams being arranged so that relative rotational movement of adjacent track elements results in rolling of the upwardly curved cams of each element on the downwardly curved cams of the other element, the device being further characterized in that said cams are formed integrally with the grousers as a discrete entity from said connectors.

3. The device as defined in claim 1 together with a guide extending from the top of the grouser of each track element and protruding through a hole in the associated cover plate.

4. The device as defined in claim 1 which is further characterized in that the grouser of each track element is formed of steel containing over 40 percent manganese.

5. The device as defined in claim 1 which is further characterized in that the wire rope of each of said connectors is a plow wire rope having a nylon core.

6. A track element for a track laying vehicle wherein a plurality of identical track elements are serially connected together to form the track, said track element comprising a grouser provided with recesses substantially across the width thereof and a coverplate removably secured to said grouser and covering the upper surface of said grousers and said recesses, and a plurality of sets of individual and identical connectors adapted to connect the track elements to an adjacent track element, each of said connectors comprising a wire rope and a pair of ferrules secured to the ends of said rope, the ferrules at one end of the several connectors in the set being adapted to be independently held in the recesses of said grouser by said coverplate so that when the coverplate is removed, any one of the connectors in the set may be individually removed without disturbing the others.

7. The track element as defined in claim 6 together with upwardly curved cams and downwardly curved cams provided at the corners of said grouser, said cams being arranged so that relative rotational movement of adjacent track elements results in rolling of the upwardly curved cams of each element on the downwardly curved cams of the other element, the track element being further characterized in that said cams are formed integrally with the grouser as a discrete entity from said connectors.

8. The track element as defined in claim 6 together with a guide extending upwardly from the top of said grouser and protruding through a hole in said cover plate.

9. The track element as defined in claim 6 which is further characterized in that said grouser is formed from steel containing over 40 percent manganese.

* * * * *